Nov. 8, 1960

W. E. WHITE 2,959,255

BRAKE FAN

Filed Jan. 24, 1958

INVENTOR.
WILLIAM E. WHITE
BY
ATTYS.

Nov. 8, 1960  W. E. WHITE  2,959,255
BRAKE FAN
Filed Jan. 24, 1958  2 Sheets-Sheet 2
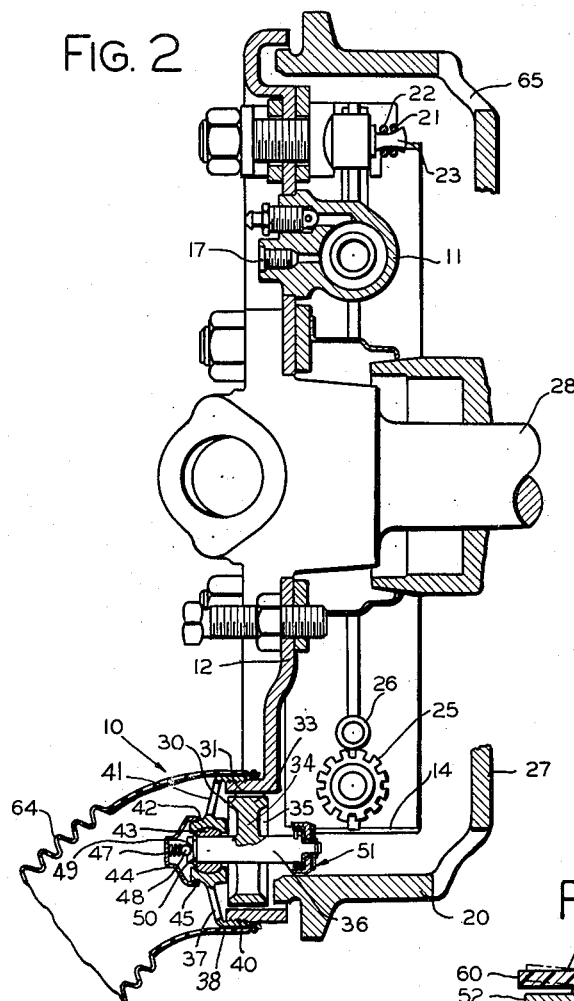
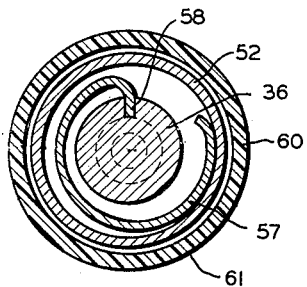
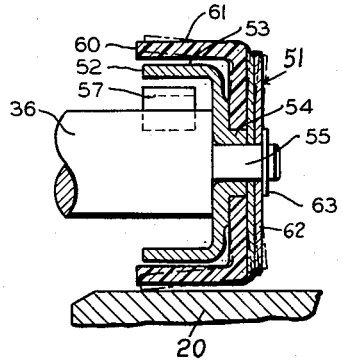
INVENTOR.
WILLIAM E. WHITE
BY
ATTYS.

United States Patent Office 2,959,255
Patented Nov. 8, 1960

2,959,255

BRAKE FAN

William E. White, Buchanan, Mich., assignor to Clark Equipment Company, a corporation of Michigan Filed Jan. 24, 1958, Ser. No. 710,919

4 Claims. (Cl. 188—264)

This invention relates, in general, to motor vehicles, in particular, to improvements in means for cooling the braking elements of motor vehicle wheels.

In the operation of motor vehicles, a great amount of heat is generated in the wheels, particularly in zones in the braking elements when the brakes are applied to slow down or halt the vehicle. There have been numerous attempts heretofore to reduce the heat generated by the brake elements, such as for example, means of agitating the air adjacent the external surface of the brake drum, subjecting the brake elements with water or other fluids, by the provision of scoops and the like around the periphery of the brake drum, and providing cooling fins and the like on the brake drum of a heat conductive material; all of which attempts have been generally unacceptable. Some of the deficiencies of such prior art devices is the fact that the means for circulating the air or fluid are usually applicable only when the vehicle is in motion; no provision being made to continue to cool braking elements when the brakes have stopped or slowed down the vehicle. Furthermore, no means have heretofore been provided for releasing or immobilizing the brake cooling device when it is not needed, such as for example, on long runs when the brakes are not applied, in order to reduce wear on the cooling device and other elements of the vehicles.

Accordingly, it is a general object of my invention to provide a new and improved means to dissipate the heat developed in vehicle brakes.

A more particular object of our invention is to provide a means of cooling a vehicle wheel brake by providing a means for blowing air over the braking elements when the braking elements exceed a pre-selected temperature and which will continue to blow air over such elements for a time after the vehicle has slowed down or stopped.

I propose to accomplish these general and particular objects by the provision of one or more relatively small fans operatively connected to a stationary element on the motor vehicle wheel and arranged whereby each of the fans is driven intermittently off the rotating element or brake drum to blow air over one or more pre-selected critical zones in the brake. The driving means for the fan is thermostatically actuated so as to engage or disengage the brake drum, as the case may be, when the temperature of the braking elements or the particular zones are above or below a pre-selected temperature. The driving means is further provided with a means to permit the fan, having suitable inertia, to continue running after deceleration or stopping of the rotating element.

A still further object of my invention is to provide a brake cooling arrangement including a rotary fan driven by a rotating brake element or brake drum, and so associated therewith that the air currents generated by the fan will be directed to a critical heat zone.

Still another and more particular object of my invention is the provision of a brake cooling arrangement including a fan in combination with a means permitting the fan to continue rotating after the rotating element to which it is drivingly connected, is decelerated or halted, thus continuing to cool the heated brake element for a time thereafter.

Still another object of my invention is the provision of a brake cooling arrangement including a thermostatically controlled fan whereby the fan is free of the rotating element to which it can be drivingly connected and will not operate when the braking elements are below a selected temperature, thus reducing wear on the parts when the fan is not needed.

Other and more particular objects of my invention will be apparent to those skilled in the art from the following description and drawings forming a part hereof and wherein:

Fig. 2 is a semi-schematic cross-sectional view of my invention in the wheel brake assembly illustrated in Fig. 1, taken along lines 2—2 of Fig. 1 and looking in the direction of the arrows;

Fig. 3 is an enlarged cross-sectional view illustrating to advantage the inner arrangement of an overrunning clutch assembly forming part of my driving element for my cooling fan; and Fig. 4 is a side elevational view illustrating to advantage the thermostatically controlled arrangement in connection with my cooling fan.

Figure 1:
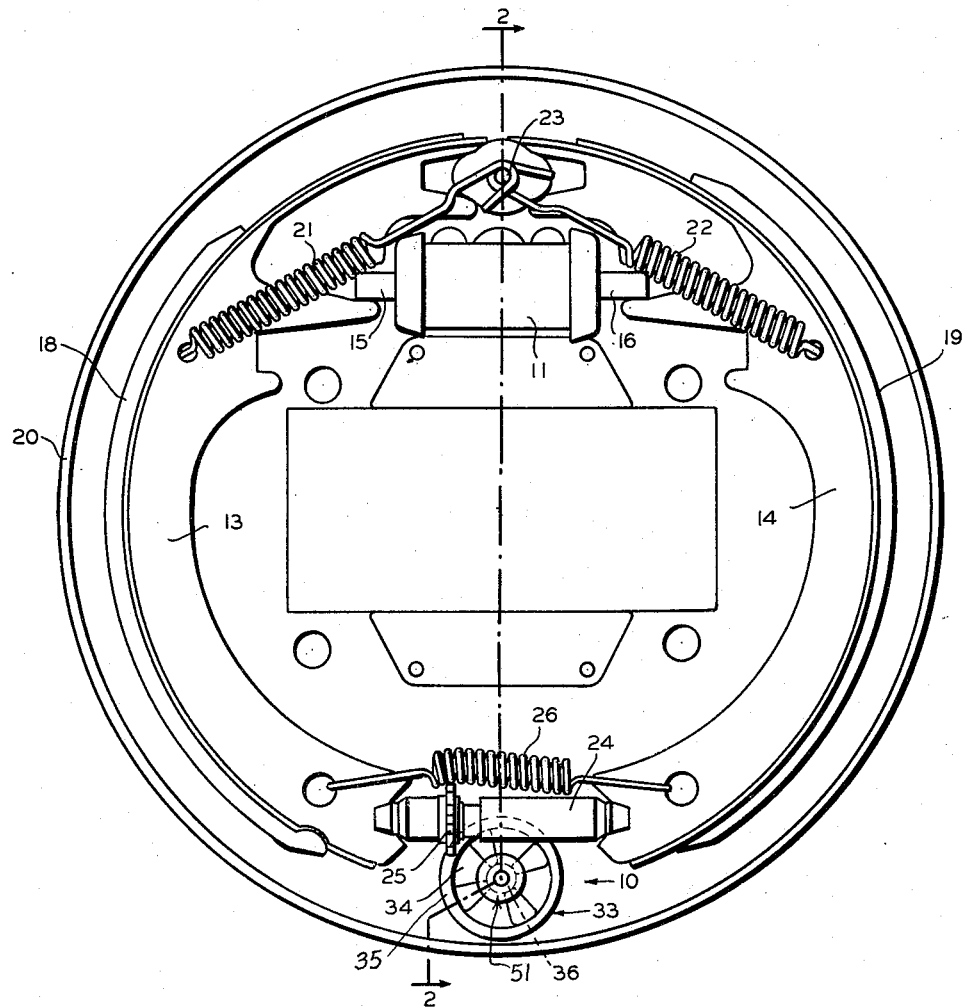
Fig. 1 is an elevational, sectional, semi-schematic view, illustrating to advantage motor vehicle brake cooling means constructed in accordance with the teachings of my invention in connection with a conventional motor vehicle wheel brake.

Turning now to the drawings, and in particular to Figs. 1 and 2 thereof, there is disclosed, fragmentarily, the working parts of a conventional wheel brake of a motor vehicle with which my improved brake element cooling arrangement, indicated in its entirety as 10, is typically associated. The wheel brake, as shown, comprises generally a brake cylinder 11, mounted on a backing plate 12, and connected to a pair of brake shoes 13, 14 by operation of a pair of oppositely acting push rods 15 and 16. Push rods 15 and 16 are in turn actuated by fluid introduced into a centrally located cylinder inlet 17 from a master cylinder (not shown) whereupon by actuation of the foot pedal (not shown) in the motor vehicle, the two oppositely acting push rods 15 and 16 are urged outwardly. In this manner, the respective brake shoes 13, 14, having brake linings 18 and 19, respectively, are forced against the inner side of the brake flange or drum 20 to slow or stop the motor vehicle in the conventional manner.

Suitable return springs 21 and 22 each respectively connected at one end to the respective brake shoes 13 and 14 and at the other end to an anchor pin 23 are provided at the top of the brake assembly and fixedly connected to backing plate 12 as shown in Fig. 1. There is also provided a suitable wheel adjuster 24 having a threadably rotatable star wheel adjustment means 25 and which cooperates with a star wheel adjuster spring 26, the ends of which are suitably connected to the lower end of the shoes 13 and 14 as shown in Fig. 1. Since the construction and general operation of this type of brake assembly is well-known, no further description thereof is deemed necessary herein, our improved brake cooling arrangement being illustrated therein for the purposes of showing the operation thereof in a conventional motor vehicle brake. It being noted that the backing plate 12 cooperates with the brake flange 20, integral web 27 and vehicle hub 28 to form a housing or enclosure for the brake elements; all of which is also conventional.

As hereinbefore mentioned, my invention contemplates a vehicle brake cooling arrangement 10 functioning to cool critical zones and braking elements when the temperature in the zones or elements exceeds in pre-selected temperature and to continue to cool such zones and elements when the vehicle has slowed down or stopped. To accomplish this function, my vehicle brake cooling arrangement 10, in this embodiment, is mounted in a port 30 formed in the backing plate 12 by the provision of the cylindrical flange 31 extending outwardly from the brake enclosure. In this port 30, my vehicle brake cooling arrangement 10 is suitably mounted to be intermittently drivingly connected to the inner periphery of the brake drum 20 as will be described.

My brake cooling arrangement 10 comprises a rotatable fan 33 having a plurality of blades 34 integrally formed with a peripheral ring 35 and a shaft 36; the shaft 36 being mounted substantially coaxially with the center of the port 30. A fan support and bearing carrier 37 having an outer cylindrical flange 38, encompasses and is suitably detachably mounted on the cylindrical flange 32 as by threads 40. Fan support and bearing carrier 37 comprises a plurality of substantially radially extending arms 41 supporting a centrally located bearing carrier 42 for supporting the sleeve bearing 43 which journals the shaft 36. A suitable cover 44 suitably affixed to the outer periphery of the bearing carrier 42, as by threads 45, supports a helical spring 47 seated at one end against the inner side of the cover 44 and at the other end against a ball bearing 48 which in turn is seated in an indentation 49 formed in one end of the shaft 36. The spring and ball bearing arrangement, permitting rotation of the shaft, serves to urge the shaft 36 inwardly towards the carrier and the enclosure against any back pressure caused by the fan 33 and a suitable split ring locking means 50, disposed about the shaft, prevents the shaft and fan from being urged too far inwardly.

At the opposite end of the shaft from the fan support and carrier 37, I have provided the thermostatically operated driving means, indicated in its entirety as 51 to drive the shaft 36 and fan 33. This driving means 51 comprises, as more clearly shown in Fig. 4, a cup-shaped drive bearing 52, the outwardly extending cylindrical side wall 53 of which encompasses a portion of the shaft and is spaced therefrom. The drive bearing 52 is further provided with an outwardly extending reduced cylindrical flange portion 54 which is encompassed about a reduced end portion 55 on the shaft 36 to be immovable axially yet rotate thereon. The cylindrical side wall 53, being spaced a distance from the periphery of the shaft 36, accommodates a clutch spring 57 (see Fig. 3) which spirals outwardly in a counter-clockwise direction and which has one end suitably affixed to the shaft 36 by insertion in a slot 58 in the shaft and the other end, resiliently and frrictionally engaging the inner periphery of the side wall 53, whereby upon rotation of the side wall 53 in a clockwise direction, bearing means will transmit torque to the shaft to drive the same. On the other hand, if the speed of the shaft is greater than the speed of the side wall 53, the spring 57 permits the shaft to rotate free of the side wall. Thus, the drive bearing 52 and spring form an overrunning clutch for a purpose hereinafter explained.

Surrounding the outer periphery of the reduced flange 54 and fixedly mounted thereon is a driving element or wheel 60 comprising a cup-shaped member having an axially flexible bottom wall and a radially flexible cylindrical outer peripheral wall 61 which encompasses, in the embodiment shown, the drive bearing 52. Driving wheel 60 is fixedly mounted at the bottom wall thereof on a bi-metallic disc or washer 62 disposed on the reduced end 55 of shaft 36. The bimetal disc 62 is arranged to bend or snap when heated to a pre-selected temperature to flex the bottom wall of the cup-shaped drive element 60 and thereby flex or urge the outer wall 61 of the wheel 60 radially outwardly, as illustrated in Fig. 4; the outer walls 61 being made of conventional brake lining material or other suitable similar slightly flexible material. When the outer wall 61 is so disposed, the wall frictionally engages the brake drum causing rotation of the drive shaft. The driving wheel, brake drum, and bi-metallic washer or disc are all suitably mounted on the shaft 55 by the split washer 63 in a conventional manner and the overrunning clutch spring 57 is arranged to drive the shaft when the driving wheel 60 engages the brake drum as is obvious.

Thus, from the above description, it can be seen that I have provided a fan disposed in proximity of the braking elements or any critical zone in the enclosure arranged to blow air from a flexible conduit 64 (Fig. 2), suitably located near a clean air source, to cool such braking elements or zone when the braking elements or zone exceed a pre-selected temperature. This is accomplished by having the thermal responsive driving wheel engage the brake drum by expansion of the wheel which in turn drives the shaft through the overrunning clutch. When the vehicle slows down or halts, the overrunning clutch permits the fan, being of a suitable mass, by its own inertia to continue to cool the braking elements or zone. When the braking elements or zone are cool, i.e., below the preselected temperature, the driving wheel disengages the brake drum to save wear on the parts even though the fan may, at certain times, continue to rotate for a while.

While I have shown and described only one fan driven off a brake drum and blowing air through the brake housing or enclosure and having only one exhaust as at 65 (Fig. 2), any number of such fans driven off any rotating brake element and any number of exhausts may be used. Too, in some applications, such fans may be utilized as exhaust fans with or without blower fans, if desired.

Wherein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. In a brake structure having a stationary support and a rotatable brake drum, a shaft journalled on said support and extending adjacent said drum, a fan element on said shaft for blowing cooling air through the brake structure, a drive wheel element on said shaft adjacent said drum, temperature responsive means operatively connected to said wheel element and responsive to temperature variations in the brake structure for moving said wheel element into and out of engagement with said drum, one of said elements being connected to said shaft for rotation therewith and the other of said elements being rotatable on said shaft, and an overrunning clutch between said other element and said shaft for operatively connecting said other element to said shaft and for accommodating continued rotation of said fan element when said drum decelerates or stops while said wheel element is engaged therewith.

2. In a brake structure having a stationary support and a rotatable brake drum, a fan rotatably mounted on said support for blowing cooling air through the brake structure, a drive wheel operatively connected to said fan and disposed adjacent said drum, said wheel comprising a radially expansible and contractable flexible member, said member when contracted being spaced from said drum and when expanded being engaged with said drum, temperature responsive means operatively connected to said wheel and responsive to temperature variations in the brake structure for radially contracting said member when the temperature in the brake structure is below a predetermined temperature and for radially expanding said member when the temperature in the brake structure exceeds said predetermined temperature, and an overrunning clutch between said fan and said wheel operatively connecting said fan to said wheel and accommodating continued rotation of said fan when said drum decelerates or stops while said wheel is engaged therewith.

3. In a brake structure having a stationary support and a rotatable brake drum, a fan rotatably mounted on said support for blowing cooling air through the brake structure, a drive wheel operatively connected to said fan and disposed adjacent said drum, said wheel comprising a cup-shaped member including an axially flexible bottom wall and a radially flexible cylindrical peripheral wall connected to said bottom wall and movable in the radial direction upon axial flexing of said bottom wall, said peripheral wall being spaced from said drum when said bottom wall is flexed in one direction and engaging said drum when said bottom wall is flexed in the other direction, and a temperature responsive bimetal disc secured to the bottom wall of said cup-shaped member for flexing said bottom wall in said one direction when the temperature in the brake structure is below a predetermined temperature and for flexing said bottom wall in said other direction when the temperature in the brake structure exceeds said predetermined temperature.

4. In a brake structure having a stationary support and a rotatable brake drum, a rotatable fan for blowing cooling air through the brake structure, a drive shaft for said fan journalled on said support and extending adjacent said drum, a radially expansible and contractable drive wheel journalled on said shaft adjacent said drum, a thermostatic element operatively connected to said wheel for causing radial expansion and contraction thereof consequent upon temperature variations in the brake structure for engaging and disengaging said wheel and said drum, a drive element secured to said wheel and including a cylindrical wall encircling said shaft, and a spiral spring secured to said shaft and frictionally engaging said wall of said drive element for frictionally connecting said wheel and said drive shaft and for accommodating overrunning rotation of said fan relative to said wheel when the brake drum decelerates or stops while said wheel is engaged therewith.

References Cited in the file of this patent

UNITED STATES PATENTS

| | | |
|---|---|---|
| 2,091,865 | Leveen | Aug. 31, 1937 |
| 2,105,176 | Ash | Jan. 11, 1938 |
| 2,127,557 | Ells | Aug. 23, 1938 |
| 2,503,262 | Hall | Apr. 11, 1950 |
| 2,708,011 | Ronning | May 10, 1955 |

FOREIGN PATENTS

| | | |
|---|---|---|
| 154,836 | Australia | Jan. 20, 1954 |
| 991,425 | France | June 20, 1951 |
| 263,760 | Italy | Mar. 28, 1929 |